June 28, 1932.  E. G. T. GUSTAFSSON  1,864,593
METHOD OF PRODUCING METAL SPONGE
Filed May 6, 1930
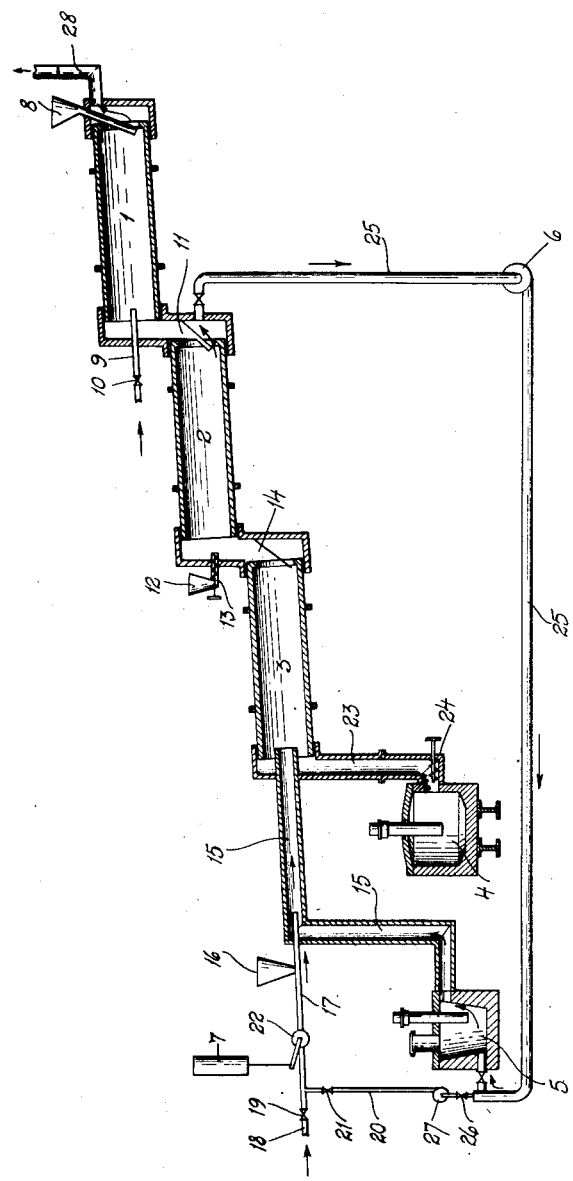
INVENTOR
Emil G. T. Gustafsson.

Patented June 28, 1932

1,864,593

UNITED STATES PATENT OFFICE

EMIL GUSTAF TORVALD GUSTAFSSON, OF STOCKHOLM, SWEDEN

METHOD OF PRODUCING METAL SPONGE

Application filed May 6, 1930, Serial No. 450,326, and in Sweden May 15, 1929.

The present invention relates to a method of producing metals in a spongy state, for instance iron sponge, cobalt sponge, nickel sponge, manganese sponge, chrome sponge and chrome-iron sponge, by reducing oxide ore or other metal oxide containing material with reducing gas in counter-current to the ore, without fusing the metal during the reduction. The reducing gas may be especially produced, for instance in gas producers of usual type or adapted to production of gas with low content of carbon dioxide, or used in circulation while regenerating its reducing power in known manner, for instance by passing the gasses through hot-blasted water gas producers with a highly heated carbon layer and/or electrically heated carbureters. The method is also applicable if the reducing gas consists of heated hydrogen containing water vapor, of hydrocarbons or the like.

It is known to produce sponge iron by reducing iron ore in form of pieces or powder with reducing gas that is circulated through or over the whole of or a part of the ore mass in treatment and through a suitable regenerating furnace (regenerator). After having been used for reduction, a suitable portion of the gas is returned to a carbureter or other regenerating furnace where the reducing power is restored to the gas, for instance by passing same through an incadescent layer of coal or the like and by repeated heating of same. However, in practice it has been found that the process has not been really technically serviceable, as it has been very difficult or complicated, firstly to reduce the content of oxidizing constituents in the gas, for instance carbon dioxide and water vapor, to such a value that a reoxidation of iron already reduced does not occur when the gas comes in contact with the practically finally reduced sponge, i. e. that a really high degree of reduction is attained in the final sponge, and secondly to regulate the temperature of the regenerated gas to that most suitable for reduction. In order to obtain a low content of the oxidizing constituents it has namely been necessary to impart to the gas such a high temperature that the gas has then caused sintering and thereby hanging or baking in the reduction furnace used, whereby its operation has been rendered highly difficult and the degree of reduction has also been deteriorated. Many times the temperature of the gas has also varied considerably so that disturbing fluctuations in the operation of the furnace have occurred.

The main object of the present invention is to bring about a remedy for these difficulties wholly or at least to the very largest extent. To this end the method according to the invention consists mainly in supplying to the reducing gases, before they are brought in contact with the charge in the furnace used for the reduction, finely divided coal or other pulverous carbonaceous material, for instance charcoal, carbocoal, peat coal, coke, or anthracite, so that the reduction of the ore takes place in presence of such carbon during the last critical stage, when reoxidation of reduced metal with oxidizing constituents in the reducing gases is to be feared.

By reason of the reduction taking place in presence of carbon, the gases entering the furnace need not have such a low content of oxidizing constituents as is the case when carbon is not present. Therefore the composition of the reducing gases need not be adapted so accurately as otherwise is necessary, that makes the regeneration easier. At the reduction temperatures now in question, for instance for iron sponge, where the reduction is preferably carried out between 850° and 1000° C. or in some cases at temperatures up to 1050° or 1100° C., depending upon the sintering temperature of the ore, or at about 1000° C., the reaction velocity in the reaction $CO_2+C \rightleftharpoons 2CO$ is rather large in the direction of forming carbon monoxide. The oxygen pressure of the gases will thereby, in spite of the reaction, $FeO+CO=Fe+CO_2$ setting in, be kept down on such a level that the gases cannot act oxidizing on the reduced metal if the content of oxidizing constituents in the gases is moderate from the beginning. Water vapor in the gases acts in the same manner as carbon dioxide. Both these reactions between gas and carbon are, however, endothermic and consume, consequently, heat, that is the temperature of the gases will be reduced if heat is not supplied from outside. However, with decreasing temperature also the reaction velocity will decrease, and a certain equilibrium will therefore soon be obtained. In the meantime the gases have come in contact with ore in a less advanced stage of reduction and can thus contain a higher percentage of oxidizing constituents and yet act reducing on the ore. During the last critical stage of the reduction the presence of the carbon has, however, prevented reoxidation of the iron in the reduced sponge, and this is in the present case the deciding point.

Still better protection against reoxidation during the last stage of the reduction will be obtained if there is additionally supplied carbon, for instance of the kind mentioned before, to the charge so that the same contains carbon during the final reduction. This carbon may either be admixed with the ore when introducing same into the furnace or be mixed with the ore firstly after an essential part of the reduction has taken place, for instance in another part or section of the reduction furnace or at a lower level in same if an undivided shaft furnace is used.

Most effective will be the action of this carbon admixed in the charge if the same in a finely divided state is mixed with finely divided ore, and the mixture is, if desired by the aid of a suitable binding agent, for instance a carbonaceous and/or water containing agent, transformed into briquettes, and the dried or in any other way hardened briquettes are then used as charge in the reduction furnace. On account of the porosity of the briquettes, that may be considerably increased, for instance, by using a low pressure in the briquetting, the gases can easily penetrate into the briquettes. Hence the diffusion of gas into and out of the briquettes will as a rule become very active. In this manner the ore will be reduced much quicker and easier than ordinary lump ore that offers much larger resistance to the diffusion of the gases or their penetrating in other ways. Therefore briquettes of ore solely, thus without coal, are reduced much easier than lump ore. If there is admixed carbon in the briquettes a reducing atmosphere is obtained within the same, even if the gases outside same contain a relatively high percentage of oxidizing constituents.

There is, however, a drawback with admixed carbon in the briquettes, namely that the pre-heating or other heating of the briquettes must be executed much more cautiously than with charge exclusively consisting of ore. In the latter case the ore may be heated to advantage in a special chamber or a special part of the reduction furnace by combusting part of the incompletely utilized reducing gases that have effected the reduction of the ore in the furnace. Thereby the combustion products may, without inconvenience, have a high content of oxidizing constituents, for instance by combustion with a high excess of air so that also roasting of the ore may take place, if desired. If there is carbon admixed this would also be combusted to a larger or less extent by such combustion on pre-heating the ore. However, by combusting the gases only in part in the pre-heating-section, that is by supplying air in deficit, the required pre-heating may take place, without any mentionable combustion of carbon occurring. Thereafter the gases can to advantage be further utilized by complete combustion with more air, for instance for drying the briquettes if a briquetted charge is used.

If the coal or the like would be mixed with the ore firstly after the latter has been reduced to a considerable degree, the ore may naturally be heated and, if desired, roasted in usual manner in a special section of the furnace before being introduced into the reducing section. Thereby the latter section consists suitably of two chambers of which the first is used for carrying out the greatest part of the reduction with the gases, while in the second chamber the ore, after having been mixed with carbon in a suitable way, is finally reduced with gas coming from the gas producer or the regenerator. Naturally, special systems of gas circulation may, if desired, be arranged in each chamber of the furnace or in the second chamber alone, whereat only the excess gas from this chamber continues through the first chamber. However, the most uncomplicated furnace arrangement is obtained if the gases are circulated over or through the whole of or the greatest part of the ore mass before being returned to regeneration or the like.

Provided that the charge and the gases are heated to the reduction temperature at their entrance into the reduction section, no additional heat is generally required for carrying out the reduction, on account of the reduction taking place while developing a small quantity of heat. At most the losses of heat from this section by radiation and convection are to be covered. If there is a great content of hydrogen in the gases, however, the reduction will consume a little heat, and in this case this heat and the heat for compensating the heat losses should be supplied to the furnace with the gases and/or the charge or in any other way. If the charge is not sufficiently heated it may be heated to full reduction temperature by means of the heat in the gases, that will thereby leave the furnace with lower temperature. Heat losses that may arise by endothermic reactions with carbon would also be taken from the heat in the gases or from heat developed in the reduction. Thus, the reduction process in the furnace may be controlled not only by regulating the composition of the reducing gases but also by regulating the quantity and the temperature of both the charge and the gases. Evidently, additional heating of the reduction furnace may, if desired, be used for compensating the heat losses from same.

The temperature of the gas coming from the producer or the regenerator, that is generally kept above that most suitable for carrying out the reduction, may be effectively controlled by supplying finely divided coal or carbonaceous material to the gas. Through the arising endothermic reaction with the carbon dioxide and/or water vapor in the gas, the temperature of the gas will be reduced to a temperature suitable for the reduction, or for iron sponge about 1000° C., for at this temperature the reactions with the carbon begin to become more slow. By the reactions the content of carbon monoxide and/or hydrogen in the gas will also increase.

The carbon may preferably be supplied to the gas by the aid of water vapor or used gas coming from the reduction furnace or of any other suitable gas that introduces the carbon, preferably in a turbulent stream, for instance in the same manner as in burners for coal powder or oil. The carbon may also be supplied in other ways, for instance by passing the gas through a chamber or the like where it meets a stream of falling, if desired by mechanical means circulated, coal or the like, without the invention being dependent thereupon. After introducing the carbon, the velocity of the gas should be kept so high that the carbon will not separate from the gas to any mentionable degree but is carried with the gas.

The quantity of carbon supplied as well as the quantity of the medium that may have been used, for instance steam or gas, are preferably regulated automatically by means of a regulator, influenced by the temperature of the reducing gas, so that only the quantities are supplied that are required for keeping the correct temperature in the gas at its entrance into the furnace. Generally the coal or the like is supplied in a certain fixed proportion to the quantity of the medium used for its introduction so that, for instance, only the latter need to be regulated. The intermixture of coal in the gas may also be combined with mixing coal in the charge.

On using for the reduction circulating gas that is regenerated before repeated use, the coal or carbonaceous material may also be added to the gases in the indicated manner before the regenerating furnace instead of after the same. If, for instance, steam is used for the introduction of the coal an effective conversion between carbon and water vapor while forming carbon monoxide and hydrogen will occur in the regenerator and/or carbureter or the final heating apparatus, whereby the regeneration of the gases is essentially facilitated. A high content of hydrogen in the gases is to advantage, as the reduction of the ore takes place more quickly with hydrogen than with carbon monoxide.

The quantity of carbon that should be supplied to the furnace either with the gases or with both gases and charge depends upon many circumstances, inter alia the nature of the ore, the composition and the temperature etc. of the reducing gases used, and should be determined by practical tests in each special case. In some cases the carbon quantity may be adapted so that it is practically completely consumed by reactions in the reduction furnace and with the reducing gases. As a rule, however, it is suitable to add more carbon than is consumed by the reactions in order to obtain certainly the intended protection. Generally, about 5% of the weight of the ore is sufficient, but smaller or larger admixtures may also be employed. When using briquetted charge and carbonaceous binding agent, for instance molasses, tar, pitch or the like, the binding agent may suitably serve as admixture of carbon. If the carbon is added to the gases before their final heating and/or regeneration the quantity should be so great that the gases still contain finely divided carbon at the entrance into the reduction furnace.

The quantity of carbon remaining with or in the sponge at its with-drawal from the reduction furnace is then easily removed by separation in known manner, for instance by dry or wet magnetic separation, wind separation, washing in water or the like or by a combination of such processes. With lump ore or briquetted charge the sponge is thereby suitably crushed before separation. If carbon has been admixed in the briquettes the sponge will, on account of the remaining carbon lying between the iron particles, be easily crushed or in other ways finely divided, especially if a relatively high excess of carbon has been used in the briquettes. Evidently also a great part of the gangue from the ore as well as of ash constituents or gangue contained in the binding agent, for instance lime, that might have been used, will be removed from the sponge. The carbon obtained in the separation may naturally be used again as admixture with new quantity of ore or gas, mixed with the required new quantity of carbon for compensating the consumed or lost carbon. By flotation of the carbon the ash may also suitably be removed from the same, before it is returned to the process.

If sulphurous coke or coal is used for carburetting the gases in the carbureters or in regenerating the reduction gases or as admixture to the gases, the sulphur may be removed from the gases in known manner by passing the hot gases through a chamber filled with limestone or burnt lime or the like.

If the ore is used in the form of briquettes, manufactured with lime as binding agent, admixed for instance in form of lime-white, the lime in the briquettes will bind also part of the sulphur if there is sulphur in the gases, which sulphur is then removed from the sponge when separating same for removing gangue, carbon etc.

As admixed carbon any coal may be employed, for instance charcoal, peat coal, semi-coke or coke, anthracite or bituminous coal. As a rule, however, porous coals are to be preferred because they react more readily with the gases. If sponge of high quality is to be produced it is suitable to use a coal with low content of sulphur as additional carbon, such as charcoal and peat coal; the coal for producing or regenerating the reducing gas can, on the contrary, be sulphurous if the sulphur is removed effectively from the gas before the entrance into the reduction furnace. Instead of coal powder finely divided oil or tar may be used as admixture to the gas, although this will be more expensive. The coal that in some cases is supplied directly into the furnace should have a size adapted to that of the ore used, but as a rule it should be comparatively small in order to obtain large reaction surfaces with the gas.

For carrying out the method according to the invention any suitable furnace arrangement may be used that renders it possible to regulate effectively the heat content in the charge and the gases entering the furnace and to obtain simultaneously an effective reaction and regeneration of the gases, the latter if gas circulation is employed. Shaft furnaces or rotary kilns as well as channel ovens may be used to advantage for the pre-heating, the reduction and, if desired, the cooling of the metal sponge obtained. Suitably the pre-heating is carried out in a special part or section of the furnace for the reduction, built together with or in any other way connected to the reduction furnace proper. The pre-heating section, that may be combined with a furnace or apparatus for drying the briquettes when charge in briquetted state is used, should be provided with suitable arrangements for air supply, for instance for successive supply of the air, so that the gases flowing through the furnace may be effectively combusted to the desired composition of the combustion gases. Suitably there is after the reduction furnace applied a special furnace or section of the reduction furnace, for instance arranged for indirect cooling by water or air, where the obtained sponge is cooled in known manner to such a temperature that it may without fear of reoxidation come in contact with the outer air.

In the accompanying drawing there is shown by way of example but by no means in limitation of the invention a furnace plant adapted for the producing of metal sponge according to this invention. The drawing shows diagrammatically a longitudinal vertical section through a plant with rotary furnaces for carrying out the reduction, it being understood, however, that also furnaces of other types can be used instead of rotary furnaces.

In the example shown the furnace plant consists of a pre-heating and, if desired, roasting section or furnace 1, the reduction sections or furnaces 2 and 3 in which the metal sponge is produced, an electric smelting furnace 4, a regenerator 5, a fan 6 for circulating the reducing gases used, and a regulator 7 controlling the supply of carbon used as admixture in the reducing gases entering the section 3.

The ore, if desired admixed with carbon, is introduced into the section 1 from a feeding hopper 8, in which section the ore is treated with oxidizing gases produced by burning gas coming from section 2 with air introduced through the pipe 9 with the controlling valve 10. The pre-heated and, if the gases are kept strongly oxidizing, roasted ore passes then through the shaft 11 into section 2 where it is partly reduced by means of reducing gases coming from section 3. At the outlet end of the furnace 2 there is placed a coal hopper 12 with a feeding screw 13, so that carbon can be admixed with the partly reduced ore. The coal may be fed in in a suitable proportion to the ore coming from the furnace 2. The ore, if desired admixed with coal, passes then through the shaft 14 into the reducing section 3 where the metal sponge is produced from the ore by means of hot reducing gases containing finely divided carbonaceous material when first coming in contact with the charge. The reducing gases are introduced at the outlet end of the furnace 3 through the conduit 15 in which powdered coal or the like is supplied to the reducing gases from a coal hopper 16 by means of gas or water vapor supplied through the pipe 17. In this case gas may be supplied from the pipe 20 with the valve 21 or water vapor from the pipe 18 with the valve 19. The quantity of water vapor or gas used for the introduction of the coal from the hopper 16 and thereby also the quantity of the coal supplied are controlled by means of a valve 22 regulated by the aid of a regulator 7 so that the gases entering the furnace 3 attain a suitable temperature. The regulator 7 may suitably be of the automatic Arca-type acted upon by the temperature of the incoming gases at the entrance of the furnace 3.

In the example shown the spongy metal passes from the reduction furnace 3 through the shaft 23 and is by means of a feeding screw 24 at the bottom of the shaft fed into an electric furnace where the sponge is further treated and, if desired, melted. If cool sponge is to be produced the electric furnace 4 should be replaced by a cooling apparatus, for instance of the rotary type.

The reducing gases utilized in the furnaces 3 and 2 are withdrawn from the inlet end of the furnace 2 through the pipe 25 by the aid of the fan 6 and introduced into a carbureter or regenerator 5, in the drawing shown of an electrically heated type. After regeneration and reheating in the regenerator 5 the reducing gases are anew introduced into the sponge production furnaces through the conduit 15. If used gas is to be employed for the introduction of the powdered coal into the regenerated gases, used gas is taken from the pipe 25 through the pipe 26 and given a suitable pressure by means of a blower 27. In such a case the gas is delivered through the pipe 20 into the pipe 17, the quantity of the gas being controlled by the valve 22 and the regulator 7.

If the utilized reducing gases are not to be regenerated and if thus a specially supplied gas is to be used as reducing agent in the furnaces 3 and 2, the regenerator 5 is replaced by, for instance, a gas producer, and the reducing gases from same are delivered through the conduit 15 to the reduction furnace 3. In such a case the fan 6 and the pipe 25 are superfluous.

The combustion gases from the pre-heating furnace 1 are led off through a chimney 28 and may be used for other heating purposes, for instance for heating the air introduced through the pipe 9.

The invention is not limited to the materials or admixtures or products nor to the furnace arrangements which have hereinbefore been mentioned by way of example only, but comprises any production of metal sponge or metal sponge containing material with the use of the method set forth. Furthermore the invention is not limited to the condition that the ore or the like treated with the reducing gases is completely reduced solely by means of said gases, but it is also applicable if only a part of the loose or briquetted charge, for instance the iron ore contained in same, is reduced with gas, while the contained ore more difficulty reduced, for instance chrome-ore, is reduced by means of thermic reducing agent, admixed in the charge, for instance ferro-silicon, ferro-aluminium-silicon, silicium-calcium or silicium-aluminium or the like, simultaneously with or after the reduction with the gases, whereat this latter reduction may be carried out in a second furnace.

What I claim as new and desire to secure by Letters Patent of the United States of America is:—

1. Method of producing metal sponge, consisting in reducing in a reduction furnace a charge, containing oxide ore or metal oxide, by means of hot reducing-gases in counter-current to the charge, and supplying finely divided carbonaceous material to said reducing gases before they come in contact with the charge in the furnace.

2. Method of producing metal sponge, consisting in reducing in a reduction furnace oxide ore or metal oxide by means of hot reducing-gases in counter-current to the ore or oxide, said gases being admixed with pulverous carbonaceous material when first coming in contact with the ore or oxide in the furnace.

3. Method of producing metal sponge, consisting in reducing in a reduction furnace oxide ore or metal oxide by means of hot reducing-gases in counter-current to the ore or oxide, said gases containing pulverous carbonaceous material during the last stage of the reduction.

4. Method of producing metal sponge, consisting in reducing in a reduction furnace a charge, containing oxide ore and carbonaceous material, by means of hot reducing-gases in counter-current to the charge, and supplying finely divided carbonaceous material to said reducing-gases before they come in contact with the charge in the furnace.

5. Method of producing metal sponge, consisting in reducing in a reduction furnace a briquetted charge, containing oxide ore, by means of hot reducing-gases in counter-current to the charge, and supplying finely divided carbonaceous material to said reducing-gases before they come in contact with the charge in the furnace.

6. Method of producing metal sponge, consisting in reducing in a reduction furnace a briquetted charge, containing finely divided oxide ore and finely divided carbonaceous material, by means of hot reducing-gases in counter-current to the charge, and supplying finely divided carbonaceous material to said reducing-gases before they come in contact with the charge in the furnace.

7. Method of producing metal sponge, consisting in reducing in a reduction furnace a charge, containing oxide ore, by means of hot reducing-gases in counter-current to the charge, supplying finely divided carbonaceous material to said reducing-gases before they come in contact with the charge in the furnace, and supplying carbonaceous material to the charge in the furnace after the greatest part of the reduction has taken place.

8. Method of producing metal sponge, consisting in reducing in a reduction furnace a charge, containing oxide ore, by means of circulating reducing-gases in counter-current to the charge, regenerating the reducing power of said circulating gases in a regenerating furnace, and supplying to the regenerated gases by means of a gaseous medium pulverous carbonaceous material in such quantity that said gases when reentering the reduction furnace contain finely divided solid carbon.

9. Method of producing metal sponge, consisting in reducing in a reduction furnace a charge, containing oxide ore, by means of circulating reducing-gases in counter-current to the charge, regenerating the reducing power of said circulating gases in a regenerating furnace, and supplying to the regenerated gases by means of water vapor pulverous carbonaceous material in such quantity that said gases when reentering the reduction furnace contain finely divided solid carbon.

10. Method of producing metal sponge, consisting in reducing in a reduction furnace a charge, containing oxide ore, by means of hot reducing-gases in counter-current to the charge, and supplying to said reducing-gases, before they come in contact with the charge in the furnace, finely divided carbonaceous material in such quantity that first the temperature of said gases is regulated by means of endothermic reaction between supplied carbon and oxidizing constituents in said reducing-gases, said reaction simultaneously improving the composition of said gases, and second an excess of finely divided carbon is contained in said gases when entering the reduction furnace.

11. Method of producing metal sponge, consisting in reducing in a reduction furnace a charge, containing oxide ore, by means of hot reducing-gases in counter-current to the charge, supplying to said reducing-gases, before they come in contact with the charge in the furnace, finely divided carbonaceous material and gas, containing oxidizing constituents, which materials by endothermic reaction with each other regulate the temperature of said reducing-gases to a temperature suitable for the reduction and add simultaneously reducing constituents to same, and adapting the quantities of said materials supplied to said gases so that the gases thus treated contain finely divided carbon when coming in contact with the charge in the furnace.

12. Method of producing metal sponge, consisting in reducing in a reduction furnace a charge, containing oxide ore, by means of hot reducing-gases in counter-current to the charge, supplying to said reducing-gases, before they come in contact with the charge in the furnace, finely divided carbonaceous material by means of a gaseous oxidizing medium, which materials by endothermic reaction with each other regulate the temperature of said reducing-gases to a temperature suitable for the reduction and add simultaneously reducing constituents to same, and adapting the quantities of said materials supplied to said gases so that the gases thus treated contain finely divided carbon when coming in contact with the charge.

13. Method of producing metal sponge, consisting in reducing in a reduction furnace a charge, containing oxide ore, by means of hot reducing-gases in counter-current to the charge, supplying to said reducing-gases, before they come in contact with the charge in the furnace, finely divided carbonaceous material by means of an oxidizing gaseous medium, which materials by endothermic reaction with each other reduce the temperature of said gases and add simultaneously reducing constituents to same, and controlling the quantities of said materials supplied to said gases by means of a regulator, influenced by the temperature of the gases entering the reduction furnace, so that said gases attain a temperature suitable for the reduction and contain finely divided carbon when coming in contact with the charge.

14. Method of producing metal sponge, consisting in reducing in a reduction furnace a charge, containing oxide ore, by means of hot reducing-gases in counter-current to the charge, supplying to said gases, before they come in contact with the charge in the furnace, finely divided carbonaceous material by means of water vapor, which materials by endothermic reaction with each other reduce the temperature of said gases and add simultaneously reducing constituents to same, and controlling automatically the quantities of said materials supplied to said gases by means of a regulator, influenced by the temperature of the gases entering the reduction furnace, so that said gases attain a temperature suitable for the reduction and contain finely divided carbon when coming in contact with the charge.

15. Method of producing iron sponge, consisting in reducing iron oxide containing material in a reduction furnace by means of hot reducing-gases in counter-current to said material, said gases containing finely divided carbonaceous material when first coming in contact with said metal containing material.

16. Method of producing chrome-iron sponge, consisting in introducing into a reduction furnace a briquetted charge, containing chromium oxide and iron oxide and thermic reducing agent, all in a finely divided state and the latter in a proportion adapted to the content of chromium oxide in the charge, reducing said charge by means of hot reducing-gases in counter-current to the charge in the furnace, said gases containing finely divided carbon when coming in contact with the charge, and reducing said chromium oxide by means of said thermic reducing agent admixed by further heating said partly reduced charge.

In testimony whereof I affix my signature.

EMIL GUSTAF TORVALD GUSTAFSSON.